Jan. 8, 1952     L. ESPENSCHIED ET AL     2,581,847
RADIANT ENERGY OBJECT LOCATING SYSTEM
Filed Aug. 23, 1940
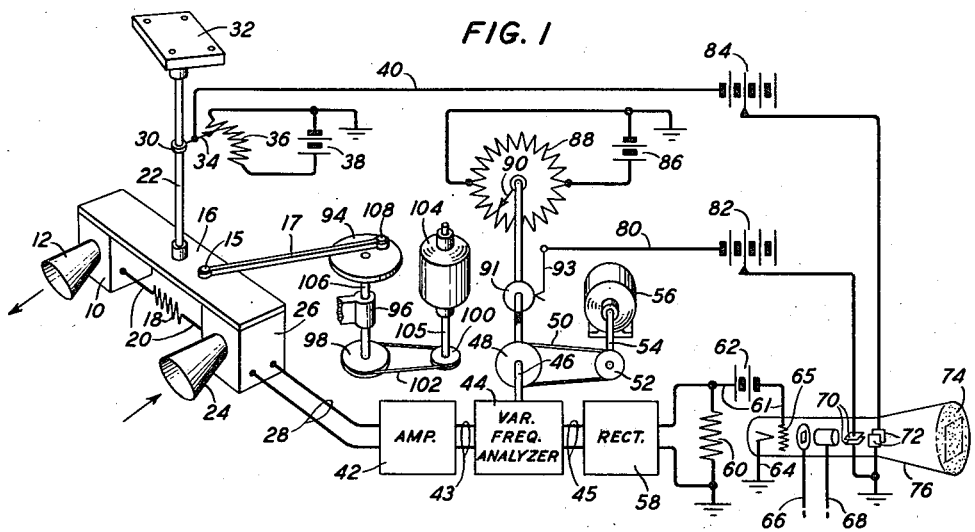
INVENTORS: L. ESPENSCHIED
J. G. CHAFFEE
BY E. V. Griggs
ATTORNEY

Patented Jan. 8, 1952

2,581,847

UNITED STATES PATENT OFFICE

2,581,847

RADIANT ENERGY OBJECT LOCATING SYSTEM

Lloyd Espenschied, Kew Gardens, N. Y., and Joseph G. Chaffee, Hackensack, N. J., assignors to Bell Telephone Laboratories, Incorporated, New York, N. Y., a corporation of New York Application August 23, 1940, Serial No. 353,902

3 Claims. (Cl. 343—10)

This invention relates to systems providing navigational aids to mobile craft, particularly to aircraft, and to systems for exploring an area from a fixed or moving object by means of electromagnetic waves. More particularly, in the illustrative embodiment to be described in detail hereinafter, it relates to systems employing frequency modulated waves which are directed toward reflecting objects, and reflections thereof are received near the transmitting point and combined with the instantly transmitted waves to obtain beat-notes, the frequencies of which are proportional to the distances to the reflecting objects. By scanning an area with the beam of waves and plotting, by means of an indicating device, azimuth angle and distance for each object from which reflections are received, a pictorial representation of the number and position of objects in the area may be obtained.

If the system is on a moving object, such as an aircraft, the pattern obtained will be a continuously and rapidly changing one and its "drift" across the indicator will provide an indication of the drift, if any, of the craft relative to the surface being explored. Also, substantial changes in the average distance of the craft from the surface will result in a shift of the pattern from its normal spread on the target to a more restricted spread and the system will thus provide indications of substantial changes in altitude. The latter indications are of particular value as provided for aircraft since the systems of the invention are normally directed to explore an area ahead of the craft and the "sudden changes in altitude" indicated are with respect to terrain well ahead of the craft, thus forewarning the pilot of ridges or other obstructions ahead before the craft has reached them.

If used at a fixed point, such as on a beacon tower, for example, the system may be employed to determine the positions of a plurality of moving objects, such as ships, and each may be advised by regular radio communication channels of its position and course relative to the other craft and to obstacles in the vicinity.

Particular objects of the invention are, therefore, to provide means for use on mobile craft, particularly aircraft, which will enable the navigator to obtain a pictorial representation in fog or at night of the obstructions and their respective positions in an area which the craft is approaching, and to provide aircraft navigators with drift indications and indications of sudden substantial changes in altitude. A further object is to provide means for use at a fixed observation point of determining in fog and darkness the direction and distance of both mobile and fixed objects within a predetermined area. Other objects will become apparent during the course of the following description and in the appended claims.

The general principles underlying the use of frequency modulated waves to obtain distance indications in the manner contemplated in this invention are explained in a paper entitled "A Terrain Clearance Indicator" by applicant L. Espenschied and R. C. Newhouse, published in the Bell System Technical Journal, vol. XVIII for January 1939. Direct reflections, as distinguished from the relatively weak diffuse reflections, are employed in the systems of the above-mentioned paper and in the systems of this invention. For each surface, or object from which a direct reflection is obtained, a beat-note having a frequency proportional to the distance of the object results when the reflected wave is combined with the instantly radiated wave and the combination is detected.

Where, for a particular beam direction, reflections from several objects at different distances are received a corresponding number of beat-note frequencies will be obtained, each beat-note having a frequency proportional to the distance of the particular object, reflection from which resulted in obtaining that particular beat-note.

Obviously then, if, for a particular azimuth angle, the frequency spectrum of possible beat-notes (determined, of course, by the range of distances in the area scanned) is analyzed or "scanned" by a frequency analyzer the number and the respective distances of objects at that azimuth angle can be determined.

This data for successive azimuth angles, as the beam is swept over the area to be surveyed, can be plotted and a composite representation of the direction and distance of every reflecting object or obstacle within the area can thus be obtained.

One convenient arrangement for plotting this data will be described in detail hereinafter and comprises a cathode ray oscillograph having a pair of horizontal deflecting plates, a pair of vertical deflecting plates and a control grid; a voltage source and a rotatable potentiometer driven by the oscillatory shaft carrying the directive antennas and connected to the horizontal deflecting plates to cause the ray of the oscilloscope to sweep back and forth across an area of the target in synchronism with the sweeping of the radio wave; and a variable frequency analyzer the response of which is swept through the possible range of beat-note frequencies, a second voltage source and a second rotatable potentiometer connecting to the vertical deflecting plates of the cathode ray oscilloscope and driven by the shaft which varies the response of the frequency analyzer causing the cathode ray to sweep up and down across an area of the target in synchronism with the variation from the low to the high frequencies of the beat-note frequency range in the frequency response of the variable frequency analyzer.

For instants at which the frequency response of the analyzer coincides with a beat-note frequency formed in the receiving detector the analyzer passes a pulse of energy which is rectified and supplied to the control grid to cause an increase in the intensity of the ray so that a pattern of bright spots is obtained on the target of the cathode ray oscillograph, the lateral position and height of any particular spot representing the azimuth angle and the distance respectively to an object in the area scanned by the radio wave from which a direct reflection was received. The respective particular apparatus details of such an arrangement are, of course, familiar in the art and numerous other arrangements providing a similar or equivalent representation can be readily devised by those skilled in the art. The complete arrangement, however, is obviously capable of representing visually for the entire area surveyed the respective distances, or depths, in the area of the several objects from which reflections are obtained as well as their respective azimuth angles.

In the systems of the invention the frequency modulated beam is spread substantially in the radial direction, so that when oscillated through an azimuth arc it will sweep a substantial area of the terrain. The effective lateral spread of the beam, of course, affects the degree of lateral resolution which will be obtained in the pattern. If the effective lateral dimension of the beam is large there will obviously be a tendency for objects, particularly those near the longitudinal center line of the area swept, to appear as laterally extending lines of spots instead of simple spots, i. e., the width of the respective reflecting objects will be exaggerated to some extent. Obviously also adjacent reflecting surfaces at about the same distance from the antenna system will tend to merge and appear substantially as a single larger object or surface. In cases where, as on rapidly moving aircraft, the principal functions of the system will be to provide drift indications and indications of substantial changes in altitude with respect to the area swept by the radio waves a relatively wide effective beam spread may be tolerated. Where the system is employed on a fixed or slowly moving object primarily for the purpose of obtaining relatively accurate indications of the width, azimuth angle and distance of objects and obstacles within a particular area a beam of relatively small effective lateral spread is, of course, desirable. Suitable adjustment of the parameters of the system to adapt it for the particular service for which it is to be used may obviously be made by means well known to those skilled in the art. A variable frequency analyzer is employed, as described above and hereinafter, to continuously scan the range of beat-note frequencies which corresponds to the range of distances within the area swept by the beam when flying at a particular altitude. An indicating member, as described above and hereinafter, is arranged to move horizontally in synchronism with the beam and vertically in synchronism with the scanning action of the frequency analyzer and to produce an indication whenever a beat-note is obtained at the output of the analyzer so that a pattern of indications, the horizontal position of each of which represents azimuth angle and the vertical position of each of which represents the distance to a reflecting object in the area swept by the radio beam, is obtained. A cathode ray indicator, as described above and hereinafter, is conveniently adaptable for such systems, its ray being deflected horizontally with the angular deviation of the radio beam and vertically with the change in frequency response of the frequency analyzer, the intensity of the beam being increased whenever a beat-note is obtained at the analyzer output. Compound electrical galvanometers employing a light ray and other similar devices could obviously also be employed as indicators for systems of the invention.

The principles and operation of systems of the invention will be more apparent in connection with the following detailed description of an illustrative embodiment and from the accompanying drawings in which:

Fig. 1 shows in block-diagrammatic form a system of the invention;

Fig. 2 shows the type of pattern which would appear on the target of a cathode ray indicator employed in the system of Fig. 1; and Fig. 3 indicates an aircraft, carrying a system as illustrated in Fig. 1, and sweeping an area of the earth's surface toward which it is approaching.

In more detail, in Fig. 1 a frequency modulated radio transmitter 10 and a radio receiver 26 are mounted on a supporting arm 16 which in turn is carried on a rotatable shaft 22 which is free to turn in supporting plate or bearing 32. Transmitter 10 and receiver 26 are equipped with directive electromagnetic radiators 12 and 24, respectively, which can be wave-guide horns or small directive antenna arrays provided with directive reflectors. Transmitter 10 is frequency modulated in the manner described in the above-mentioned article in the Bell System Technical Journal.

Arm 16 carries pin 15 which is linked to eccentric pin 108 carried on a rotatable member 94, by connecting rod 17, suitable journals and bearings being provided at each end of rod 17 to permit rotation of the respective ends of rod 17. Member 94 is carried on shaft 106 which is supported in bearing member 96 and which has fastened on its other end a pulley 98. Motor 104 having shaft 105 equipped with a pulley 100 drives pulley 98 through belt 102, effecting thereby the rotation of shaft 106 and member 94. This motion is obviously translated by rod 17 through pins 108 and 15 to cause arm 16 to oscillate through a particular horizontal angle determined by the mechanical proportions of the system and at a rate determined by the speed of motor 104. It is thus obvious that the electromagnetic wave generated in transmitted 10 and converted into a directive beam by radiator 12 is caused to sweep through a predetermined azimuth angle and that the directive electromagnetic wave absorbing device 24 is caused to turn with device 12.

Shaft 22 also carries a collar 30, constructed of suitable non-conducting material, to which is attached contacting member 34 of potentiometer 36 across which is maintained a direct potential by battery 38. Thus the potential to ground of member 34 is made to vary in synchronism with the turning motion of shaft 22 and its instantaneous values are functions of the corresponding instantaneous angles of shaft 22. Member 34 is connected to one of the horizontal deflecting plates 72 of cathode ray tube 76 by conductor 43 in which a beam centering voltage is contributed by battery 84. The other plate 72 is grounded as shown. This arrangement obviously causes the cathode ray to sweep horizontally across the target of tube 76 in synchronism with the sweeping motion of the wave emitted from radiator 12.

Receiver 26 detects reflected waves received by member 24, combines them with energy directly derived from transmitter 10 through conductor 20 in which impedance 18 is placed to control the amount of energy delivered directly to receiver 26 and the resulting modulation products, whose frequencies are indicative of the distances of the objects from which the reflected waves are received, as explained in the above-mentioned paper in the Bell System Technical Journal, are furnished amplifier 42 through conductors 28. In place of the path provided by conductor 20 and impedance 18 a suitable amount of leakage or direct transmission could readily be provided between the transmitting and receiving radiators. The output of amplifier 42 enters variable frequency analyzer 44, the frequency response of which is swept continuously back and forth through the range of beat-note frequencies corresponding to the range of distances from which it is desired to obtain indications, by shaft 46 which is rotated by motor 56 operating through motor shaft 54, pulleys 52 and 48 and belt 50.

The other end of shaft 46 carries contacting member 90 of potentiometer 88, across diametrically opposite points of which a direct potential is maintained by battery 86, so that the potential of member 90 with respect to ground is a function of the adjustment of analyzer 44 and varies proportionally with variation of that adjustment.

Member 90 is connected through slip-ring 91, which is insulated from that portion of the shaft carrying pulley 48, brush 93, conductor 80, in which a centering bias is contributed by battery 82, to one of the vertical deflecting plates 70 of cathode ray tube 76, the other vertical deflecting plate being grounded as shown. The voltage variation produced by variation of potentiometer 88 is adjusted so that the ray of tube 76 is deflected vertically in synchronism with and proportionally to the frequency response of analyzer 44.

The output of analyzer 44 is furnished to rectifier 58 through conductors 45 and the output of rectifier 58 is connected across resistance 60. Whenever the instantaneous frequency response of analyzer 44 coincides with the frequency of a beat-note furnished the analyzer by receiver 26 and amplifier 42 as above described, the beat-note energy passes through analyzer 44 to rectifier 58 which rectifies it and passes the rectified energy resulting through resistance 60. Resistance 60 is connected to control grid 65 of cathode ray tube 76 through conductor 61, in which a negative bias sufficient to produce substantial extinction of the spot on the target is provided by battery 62, in such manner that the voltage drop across resistance 60 opposes the bias of battery 62. Therefore, when a beat-note coincides in frequency with the instantaneous frequency response of analyzer 44 a voltage drop results across resistance 60 which overcomes the bias voltage 62 and permits the beam or ray of tube 76 to reach the target 74. Target 74 should be of the type, well known in the art, on which the impinging ray produces indications which persist for appreciable time intervals.

The type of pattern obtained on target 74 during the operation of the system is indicated in Fig. 2 where dotted line 92 illustrates the sweeping path of the ray of the tube under the combined influence of the variable horizontal deflecting voltage from potentiometer 36 of Fig. 1 and the variable vertical deflecting voltage from potentiometer 8 of Fig. 1 and the groups of spots $a$ to $e$, inclusive, represent impinging points of the beam with increased intensity on the target caused by the momentary coincidence of the frequency response of analyzer 44 with that of beat-notes resulting from the receipt of reflections of the emitted wave from objects or irregularities in the area being swept by the beam of radiator 12. A row of dots such as those designated $a$ indicates an obstruction of substantial breadth, such as a hill, embankment or large building or group of buildings. Other groups of dots, such as those designated $b$ to $e$, inclusive, represent smaller objects such as isolated buildings, gas tanks, etc. In order to permit the viewing of a complete representation of the objects and obstacles within the area being swept by the radio waves it is, of course, necessary, as mentioned above, to use a cathode ray oscilloscope target so coated as to have comparatively long persistence. As shown, the target can conveniently bear a horizontal scale showing horizontal angles to the right and left of a central or "course" angle or direction and a vertical scale calibrated to show the distance in thousands of yards or other convenient units. Alternatively, either extreme of the horizontal scale can obviously be designated as the zero or reference angle.

In the system of Fig. 1 amplifier 42 is preferably designed to accentuate the higher range of beat-note frequencies in order to compensate for the fact that they arise from waves reflected from more distant surfaces and consequently undergo greater attenuation. An alternative arrangement would be to receive the reflected waves, amplify, and amplitude limit them before combining them with the energy directly derived from the generating means.

Fig. 3 represents the use of the illustrative system of the invention described above and shows an aircraft 200 proceeding above a terrain upon which are shown a ridge 210, a grove of trees 214, a house 216, a gas tank 218, a barn 220 and other assorted objects. The plane 200 has suspended beneath it a rotatable arm, such as that which is designated 16 in Fig. 1, carryng directive transmitting and receiving apparatus, such as transmitter 10, receiver 26 and radiators 12 and 24 of Fig. 1, carried on a shaft 203 of Fig. 3 extending up into plane 200 where the remainder of the apparatus 202 of a system of the invention such as has been described in connection with Fig. 1 is installed.

The transmitting and receiving beams are designated generally by the number 206 and a spot or area on the ground instantaneously covered by them is designated by dotted ellipse designated 212, the curved area enclosed by the dotted line designated 208 representing the area swept by the beam as the arm carrying the transmitting and receiving apparatus is turned through its angle of oscillation. Within curved area 208 is shown an assortment of obstacles such as would result in a pattern similar to that shown in Fig. 2. Of course, where the system is carried on a rapidly moving aircraft the pattern will, as previously mentioned, move rapidly across the target giving a streaked appearance, and the chief utility of the system in such cases will be to provide drift indications and warnings of substantial altitude changes. A succession of instantaneous patterns approximating in character a moving picture could obviously be obtained by speeding up the scanning processes and connecting the oscilloscope to the system intermittently for relatively short, regularly spaced time intervals.

Obviously the oscillating arm and the receiving and transmitting apparatus carried thereby should be of the minimum practicable dimensions and weight so that they may readily be oscillated at a rapid rate. This requirement can obviously be more effectively realized by employing the highest practicable range of frequencies for the emitted beam. In any event, the apparatus is preferably enclosed in a streamlined nacelle to eliminate wind drag on the apparatus and to reduce wind resistance to a minimum. Alternatively, the complete system may be mounted within the fuselage, provided a portion thereof through which the radio waves can be emitted and received is constructed of material which will not interfere to any substantial degree with the transmission and reception of the waves in the desired manner and directions.

Obviously when a system of the invention is employed in a moving aircraft the area swept by the system will be "moving" with respect to the craft with equal speed, so that the indications of objects on the earth's surface will appear as streaks moving across the target of the indicator. The angle of travel of these streaks with respect to the angle of heading of the craft (normally represented by the perpendicular bisector of the pattern) will indicate the true direction of the craft with respect to the earth's surface, i. e., it will indicate the degree, if any, to which cross-winds are causing the motion of the craft to deviate from its heading. Systems of the invention can therefore provide drift indications as well as indications of the direction and distance of objects within the area being scanned. The general grouping of the indications will also serve as a rough index of altitude since if, for example, the system is adjusted so that indications from the area normally scanned with the plane at an elevation above the earth's surface of 1000 feet may cover substantially the full distance or vertical scale of the indicator, when the elevation is increased to 2000 feet the pattern will appear uniformly higher on the target (that is, no indications can be obtained at distances less than the length of the shorter or lower edge of the exploratory beam) and, similarly, when the elevation is decreased to 500 feet the entire pattern will be moved to a lower position on the target (i. e., no distance indications greater than the longer or upper edge of the exploratory beam can be obtained).

Systems of the invention can also obviously be designed with parameters such that they are suitable for use on marine craft, the directional transmitting and receiving portions being mounted in an elevated position such as on a mast, bridge or cabin or, similarly, for use from fixed elevated positions on towers, lighthouses, etc., and intelligence obtained can be transmitted by radio to ships or other mobile craft as to the location and courses of such craft relative to obstacles and other craft in the neighborhood.

An alternative arrangement of systems of the invention can include a transmitted beam which is spread to continuously cover the entire area to be scanned. In systems so arranged, only the directive receiving apparatus need be oscillated laterally to obtain reflections from successive angular directions of the area.

Numerous other applications of the principles and arrangements of the systems of the invention within the spirit and scope thereof will occur to those skilled in the art and no attempt is here made to cover exhaustively such applications and arrangements. The scope of the invention is defined in the following claims.

What is claimed is:

1. A system for exploring an area on the earth's surface from a point to obtain indications of the direction and distance of irregularities and obstacles within said area, which comprises means at said point for emitting a beam of frequency modulated electromagnetic waves, means for sweeping the beam through an arc such that it traverses the area, means at the emitting point for simultaneously deriving energy of said beam directly from the emitting means and for receiving energy reflected by irregularities and obstacles within said area, means for combining said directly derived and said received reflected energy to obtain beat-notes, means for analyzing the frequency distribution of said beat-notes for successive positions of said beam throughout said arc, and means for visually indicating the results of the frequency analysis comprising a mobile element, a rectangular target area over which said element can be moved, means responsive to the scanning motion of said electromagnetic beam and cooperatively connected to move said element laterally back and forth over said area in synchronism with the scanning motion of said beam, means responsive to the scanning action of said beat-note frequency spectrum and cooperatively connected to simultaneously move said element vertically back and forth over said target area in synchronism with the scanning action of said frequency analyzing means, and means responsive to beat-notes passed by said frequency analyzing means cooperatively connected to said mobile element to cause it to produce a visual indication for each beat-note frequency, whereby a two-dimensional pattern of indications the respective horizontal positions of the indications of which indicate azimuth angles and the vertical positions of which indicate distances to the respective reflecting objects in the area scanned by said electromagnetic wave beam, is obtained.

2. A system for exploring an area on the earth's surface from a point to obtain indications of the direction and distance of irregularities and obstacles within said area, which comprises means at said point for emitting a beam of frequency modulated electromagnetic waves, means for sweeping the beam through an arc such that it traverses the area, means at the emitting point for simultaneously deriving energy of said beam directly from the emitting means and for receiving energy reflected by irregularities and obstacles within said area, means for combining said directly derived and said received reflected energy to obtain beat-notes, means for analyzing the frequency distribution of said beat-notes for successive positions of said beam throughout said arc, and means for visually indicating the results of the frequency analysis, the last-stated means comprising a cathode ray tube including a control grid and horizontal and vertical deflecting plates, a first variable potential means controlled by the sweeping means connected to the horizontal deflecting plates to deflect the ray of said tube horizontally in synchronism with the sweeping motion of the radio beam, a second variable potential means controlled by the frequency analyzing means connected to the vertical deflecting plates to deflect the ray of the tube in synchronism with the variation in frequency response of the frequency analyzing means and a third potential means controlled by the output of the frequency analyzing means and connected to the control grid of said cathode ray tube to produce a visual indication on the target of the tube when a beat-note coincident in frequency with the instant frequency response of the frequency analyzer is obtained whereby the pattern of spots appearing on the target of the cathode ray tube will indicate by their horizontal position the direction of irregularities and obstacles, and by their vertical position the distance of the same from the point.

3. A system for aiding navigation of aircraft including on said craft means for covering a successive plurality of areas of the earth's surface at a predetermined distance ahead of said craft with a beam of frequency modulated waves, means on said craft for directively receiving reflections of said wave from objects within said areas, means for combining energy derived from the instantly radiated wave with the received reflections thereof to obtain beat-notes the frequencies of which are related to the distances of the objects from which reflections are received, means for analyzing the frequency distribution of said beat-notes for successive directions of reception, means for instantaneously and continuously creating on a target a succession of two-dimensional patterns of indications, one dimension of said pattern representing angular direction and the other representing distance to objects from which reflections are obtained, said last-stated means comprising a mobile element, a rectangular target area over which said element can be moved, means responsive to the scanning motion of said directive receiving means and cooperatively connected with said mobile element to move it laterally back and forth over said target in synchronism with the scanning motion of said receiving means, means responsive to the scanning operation of said beat-note frequency distribution analyzing means and cooperatively connected with said mobile element to move it vertically back and forth over said target in synchronism with the scanning action of said analyzing means, and means responsive to beat-notes passed by said analyzing means and cooperatively connected to said mobile element to cause it to produce a visual indication for each beat-note frequency, whereby the patterns representing the distribution of objects in each of the successive areas are caused to drift across the target and provide by their direction of drift an indication of the direction of motion of said craft with respect to the earth's surface, and changes in the character of the patterns will provide indications of changes in the nature of the terrain and in the elevation of the craft relative to the area being scanned.

LLOYD ESPENSCHIED.
JOSEPH G. CHAFFEE.

REFERENCES CITED

The following references are of record in the file of this patent:

UNITED STATES PATENTS

| Number | Name | Date |
| --- | --- | --- |
| 1,858,931 | Langevin et al. | May 17, 1932 |
| 2,075,808 | Fliess | Apr. 6, 1937 |
| 2,143,035 | Smith | Jan. 10, 1939 |
| 2,189,549 | Hershberger | Feb. 6, 1940 |
| 2,193,361 | Rice | Mar. 12, 1940 |